Patented Feb. 19, 1935

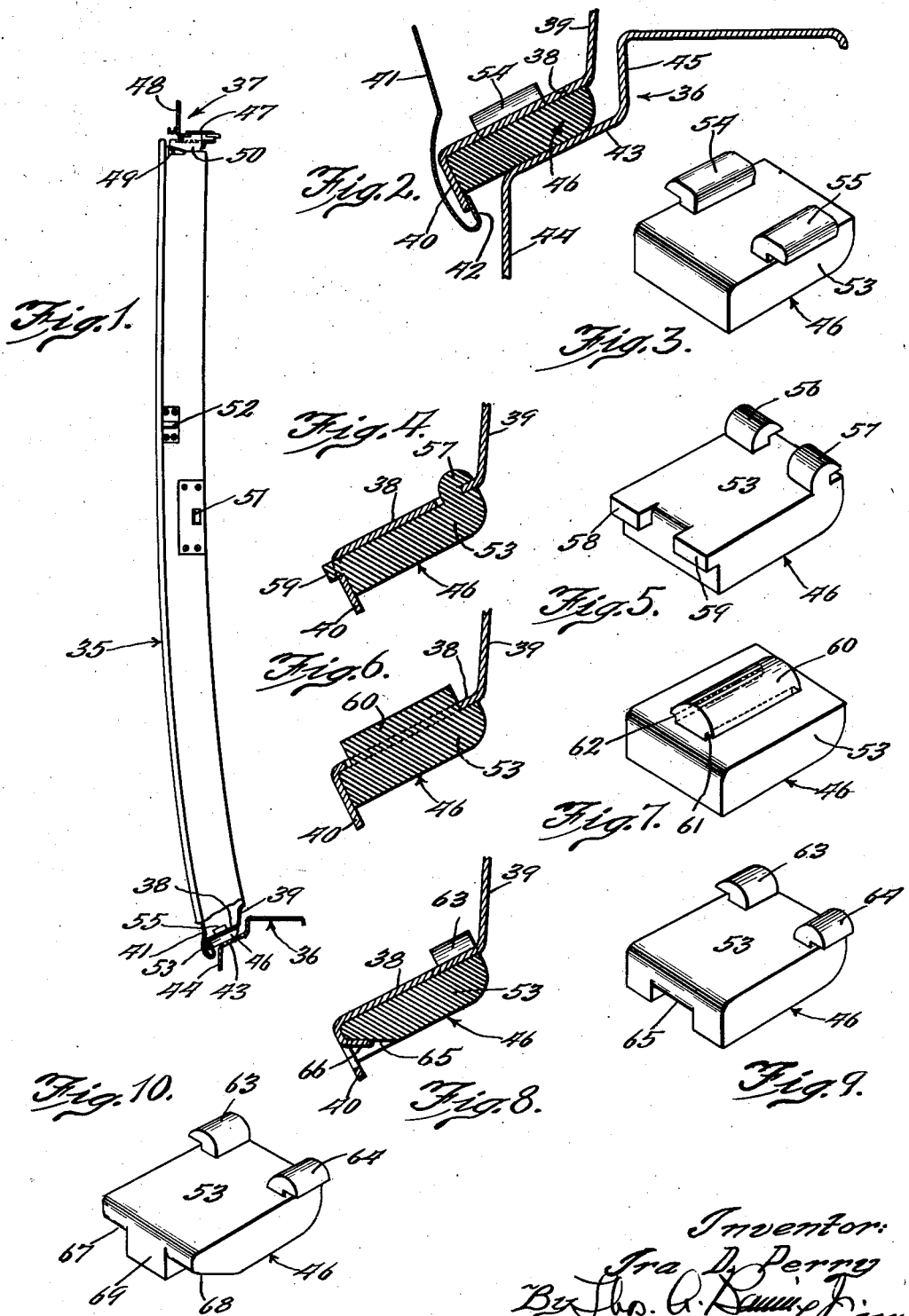

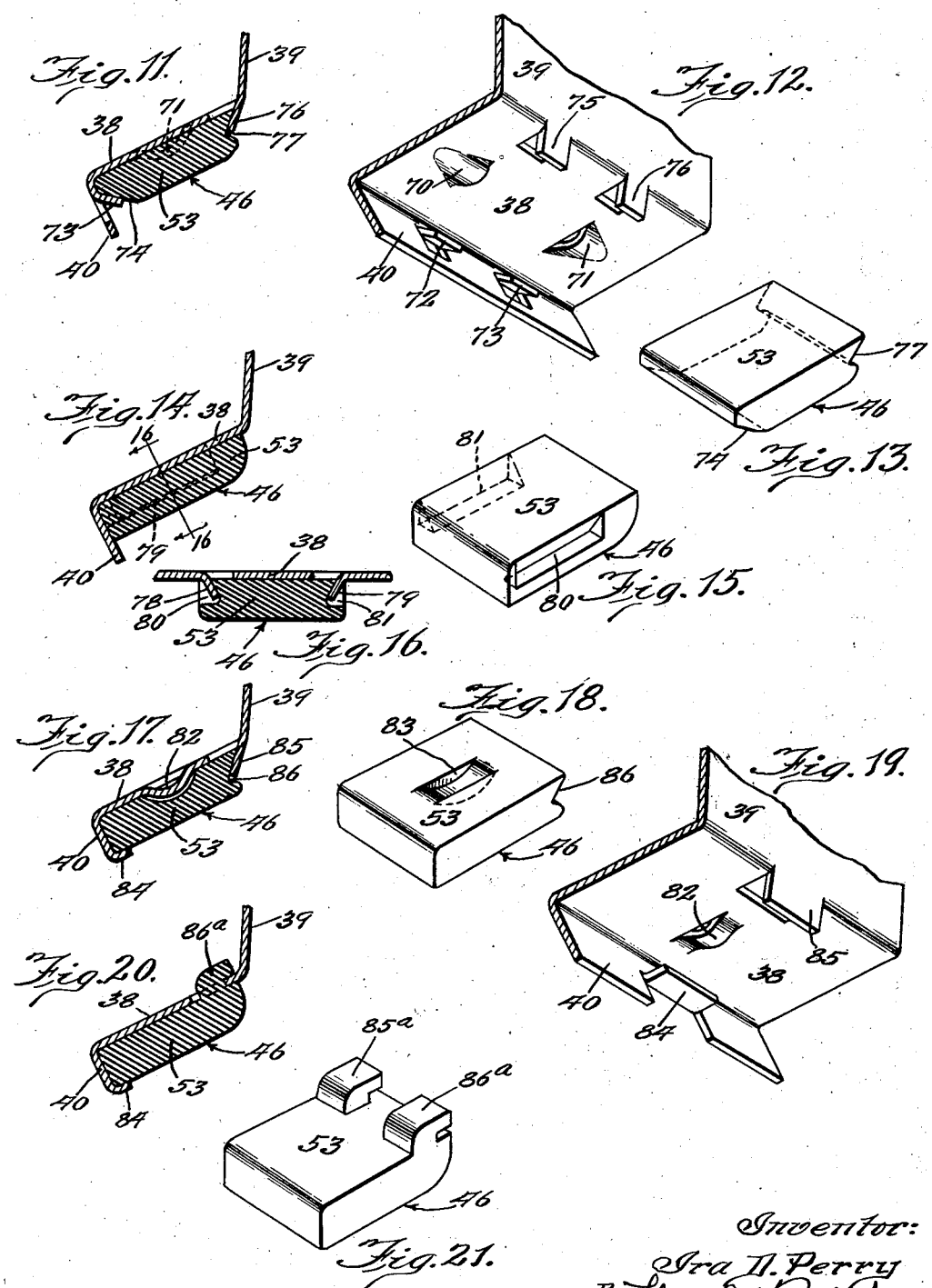

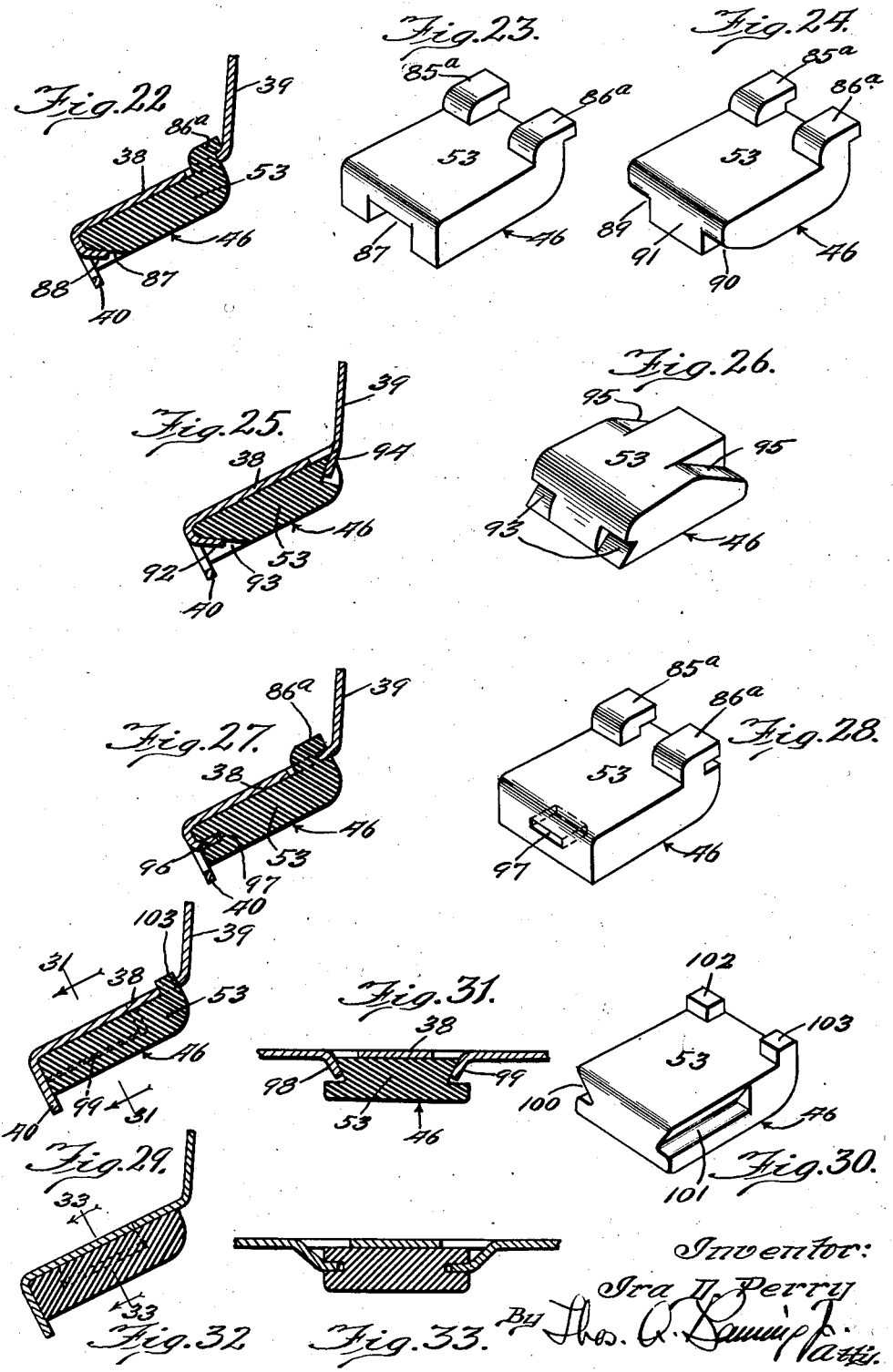

1,991,517

UNITED STATES PATENT OFFICE 1,991,517

AUTOMOBILE DOOR AND THE LIKE

Ira D. Perry, Chicago, Ill., assignor, by mesne assignments, to The Atwood Vacuum Machine Company, Rockford, Ill., a copartnership composed of Seth B. Atwood and James T. Atwood Application October 28, 1931, Serial No. 571,572

1 Claim. (Cl. 296—44)

This invention has to do with certain improvements in automobile doors and the like. The invention relates to improvements in the means for causing the upper and lower portions of the door to seat against the adjacent portions of the casing in such manner as to avoid rattling. In this connection the invention relates particularly to improvements in automobile doors which are provided at their upper and lower ends with door bumper devices which are brought to seat and establish firm contact when the door is closed. More particularly the improvements herein disclosed are especially intended for use in connection with the doors of cars embodying the structural features of so-called Ford automobiles; but it will presently appear that some of the features are usable with cars of different construction.

In the Ford type of construction the sill at the bottom of the door frame is provided with an outwardly and downwardly slanting ledge and the bottom end of the door is provided with a companion ledge which approaches the door sill ledge during the door closing operation. Furthermore in this type of automobile body construction the top end of the door casing is provided with a substantially horizontal surface beneath which there rides a companion horizontal surface on the top edge of the door during the door closing operation. The top end of the door is also provided with an upwardly and outwardly slanting relatively narrow ledge surface adjacent to the outer face of the door. In the Ford type of construction there are mounted one or more bumper blocks on the lower edge of the door, which bumper blocks are provided with downwardly and inwardly facing contact surfaces which ride onto and bind firmly against the slanting ledge aforesaid at the position of the door frame sill. Likewise in this Ford type of construction there are mounted one or more bumper block shoes on the top end of the door casing, said shoes facing downwardly and being provided with downwardly and outwardly facing surfaces which receive contact of the tapered surface above referred to on the upper end of the door.

Heretofore it has been customary to provide special bumper block clips on the lower end of the door and on the upper end of the door casing, said clips being separately attached to the door and casing respectively, by welding or riveting operations or otherwise. These clips are intended to receive the respective bumper blocks and retain them securely in place.

This type of construction is objectionable for a number of reasons. In the first place it involves the use of additional parts and operations of manufacturing and otherwise with consequent increase in cost of construction besides which these clips are apt to become broken or disengaged in service.

The main object of the present invention is to provide an improved door construction in which the lower portion of the sheet metal frame or edge of the door itself is stamped or otherwise processed so as to directly provide an arrangement and means whereby the bumper blocks can be set in place and directly attached to this portion of the door without the need of using the special attaching clips heretofore referred to. Also in this connection to provide bumper blocks of resilient material which are so formed as to be directly attachable to the so formed portion of the door itself.

More particularly it is an object of the invention to provide in some cases a door having its lower edge portion formed with suitable openings which can be directly engaged by hooked lugs or the like on the bumper blocks so as to retain said bumper blocks in place. In other cases to so form the lower edge portion of the door so as to provide lugs or ears which will engage suitably formed companion portions of the bumper blocks so as to retain said bumper blocks securely in place.

Other objects and uses of the present invention will appear from a detailed description of the same which consists in the features of construction and combinations of parts hereinafter described and claimed.

In the drawings Figure 1 shows an edge view of a typical door of the Ford type looking towards the swinging edge thereof and showing the latch or lock, and also shows the lower and upper ends of the door casing in cross section, a portion of the lower end of the door itself being broken into section so as to better reveal the bumper block in place at that position;

Figure 2 shows a fragmentary cross section through the lower end portion of the door and through the adjacent portion of the door sill, the door being in opened position and being provided with a bumper block of the type shown in Figure 1;

Figure 3 shows a back perspective view of the bumper block of the type shown in Figures 1 and 2;

Figure 4 shows a fragmentary section through the lower end of the door having applied thereto another form of bumper block embodying the features of the present invention;

Figure 5 shows a back perspective view of the bumper block shown in Figure 4;

Figures 6 and 7 show views corresponding to Figures 4 and 5 but illustrating another modified form of construction;

Figures 8 and 9 show views corresponding to Figures 4 and 5 but illustrating another modified form of construction;

Figure 10 shows a back perspective view of another modified form of block similar to that of Figure 9 with the exception that it is provided with two recesses at its lower corners with an intermediate lug instead of being provided with a single intermediate recess with two lugs at the outside as in Figure 9;

Figure 11 shows a view similar to that of Figure 4 but illustrating another modified type of construction;

Figure 12 shows a short bottom perspective view of the lower end of the door corresponding to Figure 11, the bumper block being removed;

Figure 13 shows a back perspective view of the bumper block of Figures 11 and 12;

Figures 14 and 15 show views similar to Figures 4 and 5 but illustrating another modified form of construction;

Figure 16 shows a cross section on the line 16—16 of Figure 14 looking in the direction of the arrows;

Figures 17 and 18 show views corresponding to Figures 4 and 5 but illustrating another modified form of construction;

Figure 19 shows a bottom perspective view of a short section of the lower edge of the door corresponding to Figure 17;

Figures 20 and 21 show views corresponding to Figures 4 and 5 but illustrating another modified form of construction;

Figures 22 and 23 show views corresponding to Figures 8 and 9 but illustrating another modified type of construction;

Figure 24 shows a perspective view corresponding to Figure 23 but illustrating another modified form of bumper block in which the same is provided with a pair of downwardly slanting recesses at its lower corners with an intermediate lug instead of a single central downwardly extending recess together with corner lugs as in Figure 23;

Figures 25 and 26 show views corresponding to Figures 4 and 5 but illustrating another modified form of construction;

Figures 27 and 28 show views corresponding to Figures 22 and 23 but illustrating another modified form of construction;

Figures 29 and 30 show views corresponding to Figures 14 and 15 but illustrating another modified form of construction;

Figure 31 shows a cross section on the line 31—31 of Figure 29 looking in the direction of the arrows.

Figure 32 shows a view illustrating another modified form of construction; and Figure 33 shows a cross section on line 33—33 of Fig. 32 looking in the direction of the arrows.

Referring first to Figure 1 the door structure in its entirety is designated by the numeral 35. The sill at the lower edge of the door is designated by the numeral 36 and the upper end portion of the door casing by the numeral 37. The door frame is made of sheet metal including the inwardly facing downwardly slanting flange 38 at the lower edge of the door, said flange terminating in the upwardly extending portion 39 at its inner edge and in the downwardly and inwardly reaching lip 40 at its lower edge. The outer face of the door is finished by sheet metal 41 generally of thinner gauge than the sheet metal of which the edge portion of the door is made. The sheet 41 has its lower edge 42 folded up and inwardly against the edge portion of the lip 40. The door sill 36 is made of sheet metal folded to provide the downwardly and outwardly slanting sill ledge 43 which is companion to the lower edge 38 of the door proper. When the door is closed and opened the portion 38 of the door advances towards or recedes from the portion 43 as the case may be. The door sill is also provided with the downwardly and upwardly extending flanges 44 and 45 respectively.

The lower edge 48 of the door proper carries a bumper block 46 which seats directly against the portion 43 of the sill and comes to a firm bearing thereon. As the door is forced closed there will be a slight deflection or sliding of the bumper block 46 during the compression thereof which takes place incident to the forcing of the door into the closed and latched condition.

The upper end of the door casing 37 is made of sheet metal and is provided with an inwardly extending flange 47 which reaches directly inwardly substantially parallel to the direction of door closing movement; and is also generally provided with a portion 48 which extends inwardly substantially at right angles thereto. The upper end of the door proper is provided with a relatively narrow tapered or slanting seat 49 adjacent to the outer face of the door. A bumper block shoe 50 is secured to the upper end of the door casing in position to be engaged by the top edge of the door with a wiping movement as the door is forced home. Usually this shoe has its outer end provided with a tapered surface which receives and contacts with the tapered surface 49 on the upper end of the door proper. The swinging edge of the door also carries the usual latch or lock 51 and in some cases the guide finger 52 which engages a companion recess in the door casing.

In the construction shown in Figures 2 and 3 in part the bumper block includes a head portion 53 of resilient material having on its back face a pair of upwardly and outwardly extending hooked lugs 54 and 55 which reach through companion openings formed in the lower end portion 38 of the door proper so as to secure the bumper block in place. The lower and outer end of the bumper block 46 seats squarely against the flange 40 as shown in Figure 2 so as to effectively resist the displacing force on the bumper block incident to the door closing operation.

In the arrangement of Figures 4 and 5 the bumper block includes the body portion 53, but in the present case the lugs 54 and 55 are dispensed with and in place thereof there are provided other hooked lugs 56 and 57 which reach through corresponding openings in the flange 38 of the door; and the body 53 of the bumper block is also provided with other downwardly extending lugs 58 and 59 which reach through companion openings in the lip 40 of the door.

In the arrangement of Figures 6 and 7 the body portion of the bumper block 46 is provided with a single elongated lug 60 which is undercut on both sides as shown at 61 and 62 so that said lug can be forced through a companion opening in the flange 38 on the lower end of the door and thereby locked in place.

In the construction shown in Figures 8 and 9 the body portion 53 of the bumper block is provided with a pair of outwardly and upwardly hooked lugs 63 and 64 at its upper end. The lower end of the body of the bumper block is provided with a central inwardly slanting recess 65; and the lip 40 of the lower end of the door is provided with an ear 66 which is struck inwardly so as to engage the socket of recess 65 in order to lock the bumper block into place as shown in Figure 8.

The arrangement in Figure 10 is similar to that just explained. However in the present case the lower end of the body of the bumper block is provided with a pair of inwardly reaching recesses 67 and 68 together with an intermediate lug 69; and the lip 40 of the lower portion of the door is provided with a pair of lugs such as 66 corresponding thereto.

In the construction shown in Figures 11, 12, and 13 the flange portion 38 at the lower end of the door proper is provided with a pair of downwardly struck ears 70 and 71 between which the body portion 53 of the bumper block 46 is received and accommodated and supported against endwise movement. The lip 40 of the lower end of the door is provided with one or more inwardly struck lugs 72 and 73 which engage a lower bevelled surface 74 on the lower edge of the bumper block 46; and another pair of ears 75 and 76 are struck down from the flange 38 so as to engage an upwardly slanting surface 77 at the upper end of the body of the bumper block.

In the modified arrangement of Figures 14, 15, and 16 the flange 38 of the lower end of the door is provided with a pair of inturned ears 78 and 79 facing each other; and the body 53 of the bumper block 46 is provided with side recesses 80 and 81 to receive said ears when the bumper block is in place.

In the modified arrangement of Figures 17, 18, and 19 the flange 38 at the lower end of the door is provided with a central downwardly struck semi-perforated ear 82 which enters into a central recess 83 in the top face of the body 53 of the bumper block. The lip 40 of the lower end of the door is provided with an inwardly struck hooked lug 84 which engages the lower end of the body portion of the bumper block to support the same; and an ear 85 is struck down from the flange 38 on an angle so as to engage the upwardly slanting surface 86 at the upper end of the body of the bumper block.

In the modified arrangement of Figures 20 and 21 the lip 40 at the lower end of the door is provided with the upwardly and inwardly struck ear 84 which engages the lower end of the body of the bumper block. In this case the upper end portion of the bumper block is provided with a pair of upwardly extending hooked lugs 85 and 86 which reach through corresponding openings of the flange 38 of the door and engage against the back face thereof.

The modified arrangement of Figures 22 and 23 is similar to that of Figures 20 and 21. However in the present case the lower central portion of the body of the bumper block is recessed as shown at 87 to receive the inturned hooked lug 88, the lugs 85 and 86 being provided on the upper end of the bumper block as in the previous construction.

The arrangement of Figure 24 is similar to that of Figures 22 and 23, but in the present case there are two upwardly slanting recesses 89 and 90 in the lower end portion of the bumper block which receive companion lugs of the flange 40 of the lower end of the door, the lug 91 being located between the recesses 89 and 90.

In the modified construction of Figures 25 and 26 the lip 40 of the lower end portion of the door is provided with a pair of inwardly struck lugs 92 which are adapted to engage corresponding inwardly formed recesses 93 in the lower end portion of the body of the bumper block; and the flange 38 of the lower edge of the door is provided with a pair of downwardly struck ears 94 adapted to engage corresponding recesses 95 of the upper end of the body of the bumper block.

In the construction of Figures 27 and 28 the lip 40 of the lower end of the door is provided with a single inwardly struck lug 96 adapted to engage an inwardly extending socket 97 in the lower end of the body of the bumper block; the bumper block being provided with upwardly extending hooked lugs such as 85 and 86 of the arrangements shown in Figures 23 and 24.

In the modified construction of Figures 29, 30, and 31 the flange 38 of the lower end of the door is provided with the inwardly struck ears 98 and 99 adapted to engage the inwardly extending side recesses 100 and 101 of the body portion of the bumper block, being in this respect similar to the arrangement of Figures 14, 15, and 16. In the present case however the body of the bumper block is also provided with the upwardly extending lugs 102 and 103 which extend through corresponding openings in the flange 38 in the lower end of the door as evident from Figure 29.

In the modified form of Figs. 32 and 33 the flange of the door is provided with inwardly struck ears which are bent parallel with the flange and are inserted in grooves parallel with the faces of the bumper.

It will be noted that in each of the constructions herein disclosed the bumper block is secured to the lower end portion of the door solely by means of interengaging lugs and sockets on companion portions of the door and bumper block.

While I have herein shown and described only certain embodiments of the features of my present invention still I do not intend to limit myself thereto except as I may do so in the claim.

I claim:

In a metal door construction, a sheet metal door body formed at the bottom to provide an inclined edge portion for seating thereon of a flat bumper, and the sheet metal of said body being bent to provide a downwardly projecting flange integral with said inclined edge portion adapted to serve as a backing for support of the outer edge of a bumper placed on the edge portion, the sheet metal of said body being further formed to provide an opening in the inclined edge portion in a predetermined relation to said flange adapted to receive and retain a portion of a bumper block placed on the edge portion, and said flange being formed to provide a projecting lug adapted to engage a portion of a bumper block placed on the edge portion to further retain the same in position.

IRA D. PERRY.